US010176930B2

(12) United States Patent
Eidelman et al.

(10) Patent No.: US 10,176,930 B2
(45) Date of Patent: Jan. 8, 2019

(54) LOW PROFILE FLAT WET ELECTROLYTIC TANTALUM CAPACITOR

(71) Applicant: VISHAY SPRAGUE, INC., Bennington, VT (US)

(72) Inventors: Alex Eidelman, Beer-Sheva (IL); Matthew Lang, Milford, CT (US); Timothy Bishop, Bennington, VT (US); Stephen Breithaupt, North Bennington, VT (US)

(73) Assignee: Vishay Sprague, Inc., Bennington, VT (US)

( * ) Notice: Subject to any disclaimer, the term of this patent is extended or adjusted under 35 U.S.C. 154(b) by 160 days.

(21) Appl. No.: 14/995,909

(22) Filed: Jan. 14, 2016

(65) Prior Publication Data

US 2017/0207031 A1 Jul. 20, 2017

(51) Int. Cl.
H01G 9/10 (2006.01)
H01G 9/145 (2006.01)
H01G 9/035 (2006.01)
H01G 9/02 (2006.01)
H01G 9/00 (2006.01)
H01G 9/26 (2006.01)

(52) U.S. Cl.
CPC ............ H01G 9/10 (2013.01); H01G 9/0029 (2013.01); H01G 9/02 (2013.01); H01G 9/035 (2013.01); H01G 9/145 (2013.01); H01G 9/26 (2013.01)

(58) Field of Classification Search
CPC .......... H01G 9/10; H01G 9/02; H01G 9/0029; H01G 9/035
See application file for complete search history.

(56) References Cited

U.S. PATENT DOCUMENTS

| 2,686,892 A | | 8/1954 | Lilienfeld | |
|---|---|---|---|---|
| 3,976,922 A | * | 8/1976 | Peck | ......... H01G 9/08 361/434 |
| 4,546,415 A | * | 10/1985 | Kent | ......... H01G 9/00 361/511 |
| 4,780,797 A | | 10/1988 | Libby | |

(Continued)

FOREIGN PATENT DOCUMENTS

| JP | 56-169534 U | 12/1981 |
|---|---|---|
| JP | 02-280310 A | 11/1990 |

(Continued)

Primary Examiner — David M Sinclair
(74) Attorney, Agent, or Firm — Volpe and Koenig, P.C.

(57) ABSTRACT

A low profile wet electrolytic capacitor is disclosed. The low profile wet electrolytic capacitor includes an outer case assembly. The outer case assembly is formed by an outer case and outer case cover that is hermetically sealed to the outer case. The outer case assembly includes an interior area. A capacitive element is positioned in the interior area. The capacitive element is isolated from the outer case assembly by a plurality of insulative elements. A connecting tube is positioned perpendicular to and attached to the outer case and the outer case cover and passes through an opening in the capacitive element. An isolated positive lead is positioned on the outer case assembly and is in electrical communication with the capacitive element. A fluid electrolyte is contained in the interior area of the outer case assembly. A method of forming the capacitor and stacked capacitor assemblies is also provided.

19 Claims, 10 Drawing Sheets

(56) References Cited

U.S. PATENT DOCUMENTS

| | | | |
|---|---|---|---|
| 4,942,500 | A | 7/1990 | Libby et al. |
| 5,043,849 | A | 8/1991 | Libby |
| 5,131,388 | A | 7/1992 | Pless et al. |
| 5,288,566 | A * | 2/1994 | Ginatta ............... H01M 10/18 |
| | | | 429/210 |
| 5,334,219 | A | 8/1994 | Kroll |
| 5,522,851 | A * | 6/1996 | Fayram ............... A61N 1/3956 |
| | | | 361/301.4 |
| 5,607,454 | A | 3/1997 | Cameron et al. |
| 5,621,608 | A | 4/1997 | Arai et al. |
| 5,673,168 | A * | 9/1997 | Efford ..................... H01G 2/08 |
| | | | 361/274.2 |
| 5,801,917 | A * | 9/1998 | Elias .................... A61N 1/3956 |
| | | | 361/508 |
| 5,926,362 | A | 7/1999 | Muffoletto et al. |
| 6,197,184 | B1 * | 3/2001 | Hemphill ............... C25D 11/02 |
| | | | 205/152 |
| 6,231,993 | B1 | 5/2001 | Stephenson et al. |
| 6,334,879 | B1 | 1/2002 | Muffoletto et al. |
| 6,400,554 | B1 | 6/2002 | Shiraishi et al. |
| 6,522,524 | B1 | 2/2003 | Feger et al. |
| 6,678,559 | B1 | 1/2004 | Breyen et al. |
| 6,801,424 | B1 * | 10/2004 | Nielsen .................... H01G 9/08 |
| | | | 361/517 |
| 6,807,048 | B1 | 10/2004 | Nielson et al. |
| 6,819,544 | B1 | 11/2004 | Nielsen et al. |
| 6,850,405 | B1 | 2/2005 | Mileham et al. |
| 7,012,799 | B2 | 3/2006 | Muffoletto et al. |
| 7,085,126 | B2 | 8/2006 | Muffoletto et al. |
| 7,092,242 | B1 | 8/2006 | Gloss et al. |
| 7,118,828 | B2 * | 10/2006 | Dodd ....................... H01M 2/14 |
| | | | 429/128 |
| 7,169,284 | B1 | 1/2007 | Jiang et al. |
| 7,271,994 | B2 | 9/2007 | Stemen et al. |
| 7,274,551 | B1 | 9/2007 | Parler, Jr. et al. |
| 7,419,873 | B2 | 9/2008 | Doffing et al. |
| 7,483,260 | B2 | 1/2009 | Ziarniak et al. |
| 7,531,010 | B1 * | 5/2009 | Feger ....................... H01G 9/02 |
| | | | 257/E21.008 |
| 7,710,713 | B2 | 5/2010 | Restorff et al. |
| 7,715,174 | B1 | 5/2010 | Beauvais et al. |
| 7,813,107 | B1 | 10/2010 | Druding et al. |
| 2004/0120099 | A1 * | 6/2004 | Elliott ..................... H01G 9/008 |
| | | | 361/301.5 |
| 2004/0240149 | A1 | 12/2004 | Lessner et al. |
| 2005/0077342 | A1 | 4/2005 | Chen et al. |
| 2005/0177193 | A1 | 8/2005 | Nielsen et al. |
| 2005/0219787 | A1 | 10/2005 | Stevenson et al. |
| 2005/0264979 | A1 * | 12/2005 | Breyen .................... A61N 1/375 |
| | | | 361/517 |
| 2006/0012945 | A1 | 1/2006 | Doffing et al. |
| 2006/0018079 | A1 | 1/2006 | Barr et al. |
| 2006/0279906 | A1 * | 12/2006 | Stemen ................... H01G 9/042 |
| | | | 361/517 |
| 2006/0279907 | A1 | 12/2006 | Doffing et al. |
| 2008/0026286 | A1 | 1/2008 | Cui et al. |
| 2008/0170353 | A1 * | 7/2008 | Swanson ............... A61N 1/3975 |
| | | | 361/522 |
| 2008/0232029 | A1 | 9/2008 | Ning |
| 2008/0232032 | A1 | 9/2008 | Jones et al. |
| 2009/0273885 | A1 | 11/2009 | Jiang et al. |
| 2010/0268292 | A1 | 10/2010 | Eidelman et al. |
| 2010/0318142 | A1 | 12/2010 | Chen |

FOREIGN PATENT DOCUMENTS

| | | |
|---|---|---|
| JP | 3-41921 U | 4/1991 |
| JP | 05-234814 A | 9/1993 |
| JP | 09-326327 A | 12/1997 |
| WO | 94/00193 A1 | 1/1994 |
| WO | 2005/001997 A1 | 1/2005 |
| WO | 2010/121018 A1 | 10/2010 |

* cited by examiner

LOW PROFILE FLAT WET ELECTROLYTIC TANTALUM CAPACITOR

FIELD OF INVENTION

This application relates to the field of electronic components, and more specifically, capacitors.

BACKGROUND

Wet capacitors are used in the design of circuits due to their volumetric efficiency, stable electrical parameters, high reliability and long service life. Such capacitors typically have a larger capacitance per unit volume than certain other types of capacitors, making them valuable in high-current, high-power, and low-frequency electrical circuits. One type of wet capacitor is a wet electrolytic capacitor. A wet electrolytic capacitor includes two conducting surfaces (an anode and a cathode) whose function is to conduct electricity, and a fluid electrolyte. An insulating material or dielectric separates the two conducting surfaces. Wet electrolytic capacitors tend to offer a good combination of high capacitance and low leakage current.

Wet electrolytic capacitors are basic to various types of electrical equipment from satellites, aerospace, airborne, military group support, oil exploration, power supplies, and the like. In any of these example applications, the capacitor may be exposed to harsh environmental conditions, including extreme temperatures, pressure, moisture, shock, vibration, and the like. The capacitor must be able to withstand these harsh environmental conditions while maintaining its accuracy, service life, and ability to be powered at very high temperatures with no maintenance. Failure of a capacitor due to harsh environmental conditions would necessitate its removal for repairs, which would result in delays and other associated expenses. Additionally, many of these example applications include significant dimensional or layout constraints, as the field of electronics is consistently demanding smaller parts and devices. For example, reductions in both mounting area and component profile (i.e., height) are highly demanded in most current applications.

Known wet electrolytic capacitors, such as Tantalum (Ta) electrolytic capacitors, are generally characterized as having a cylindrical shape and axial leaded terminations. Tantalum electrolytic capacitors known in the art may use tantalum for the anode material. The tantalum anode body (also commonly referred to as a "slug" or "pellet") is usually sintered. A wire (which may also be formed of tantalum) is commonly formed in the anode body in one of two ways: (1) "embedded," meaning the wire is covered with tantalum powder during a pressing process; or (2) "welded," meaning after the pellet is pressed and sintered, the wire is welded to the tantalum anode body. The other end of the wire extends outside of the tantalum anode body. The capacitor dielectric material may be made by anodic oxidation of the anode material to form an oxide layer over the surface of the anode body (e.g., Ta to $Ta_2O_5$). A capacitor cathode may be formed by coating an inner surface of the body or case of the capacitor that encloses the tantalum anode body. The cathode may be formed of sinter tantalum or electrophoretically deposited tantalum, and may be attached to a cathode wire. A fluid electrolyte separates the cathode and the anode body and provides for electrical communication between the cathode and anode body. Although cylindrical shaped capacitors with axial leaded terminations generally perform reliably in harsh environmental conditions, their provided energy density is limited by their cylindrical shape and limited surface area of their conducting surfaces (anode and cathode), as the surface area of the two conducting surfaces determines the capacitance of the capacitor. Additionally, dimensional constraints often make their application difficult.

Other types of known wet electrolytic capacitors are characterized as having a circular or square shaped capacitor body or "can" with radial leaded terminations. While circular or square shaped capacitors with radial leaded terminations may provide higher energy density when compared to cylindrical shaped capacitors with axial leaded terminations, their ability to operate in harsh environmental conditions is limited. For example, circular or square shaped capacitors with radial leaded terminations generally are more susceptible to elevated temperatures that cause capacitor swelling. Additionally, circular or square shaped capacitors with radial leaded terminations generally have limited ability to survive in high shock or vibration environments.

Thus, there remains a need for an improved wet electrolytic capacitor capable of operating in harsh environmental conditions characterized by high energy density and a low profile to comply with common dimensional constraints.

SUMMARY

In one aspect of the present invention, a low profile wet electrolytic capacitor is disclosed. The low profile wet electrolytic capacitor includes an outer case assembly. The outer case assembly is formed by an outer case and outer case cover that is hermetically sealed to the outer case. The outer case assembly includes an interior area. A capacitive element is positioned in the interior area. The capacitive element is isolated from the outer case assembly by one or more insulative elements. A connecting tube is positioned perpendicular to and attached to the outer case and the outer case cover and passes through an opening in the capacitive element. An isolated positive lead is positioned on the outer case assembly and is in electrical communication with the capacitive element. A negative terminal is positioned on the outer case assembly. A fluid electrolyte is contained in the interior area of the outer case assembly.

The present invention is also directed to, in another aspect, multiple low profile wet electrolytic capacitors mounted in a capacitor stack. Multiple low profile wet electrolytic capacitors may be mounted in a stacked formation or capacitor stack and electrically connected to one another in parallel or in series.

A method of making a low profile wet electrolytic capacitor is also provided. A method of making a low profile wet electrolytic capacitor may preferably comprise the steps of: forming an outer case defining an interior area; forming an outer case opening in a wall of the outer case; positioning an insulator band around a perimeter of the interior area of the outer case; forming a connecting tube; welding the connecting tube to the outer case at the outer case opening; positioning an insulator tube over the connecting tube; forming an outer case cover; forming an outer case cover opening in a wall of the outer case cover; positioning a first and second cathode layer on an internal surface of the outer case and the outer case cover; forming a capacitor element; positioning the capacitive element in the interior area of the outer case; welding the outer case cover to the outer case and connecting tube; positioning a positive lead insulator over the outer case; welding a positive lead over the positive lead insulator to the cathode element; and welding a negative terminal to the outer case.

A method of making a low profile wet electrolytic capacitor stack assembly having a plurality of capacitors electrically connected to one other in parallel or in series is also provided.

BRIEF DESCRIPTION OF THE DRAWINGS

A more detailed understanding may be had from the following description, given by way of example in conjunction with the accompanying drawings wherein:

FIG. 3A is an enlarged detailed view of the area defined by 3A in FIG. 3;

DETAILED DESCRIPTION OF THE PREFERRED EMBODIMENT(S)

Figures 1, 1A:
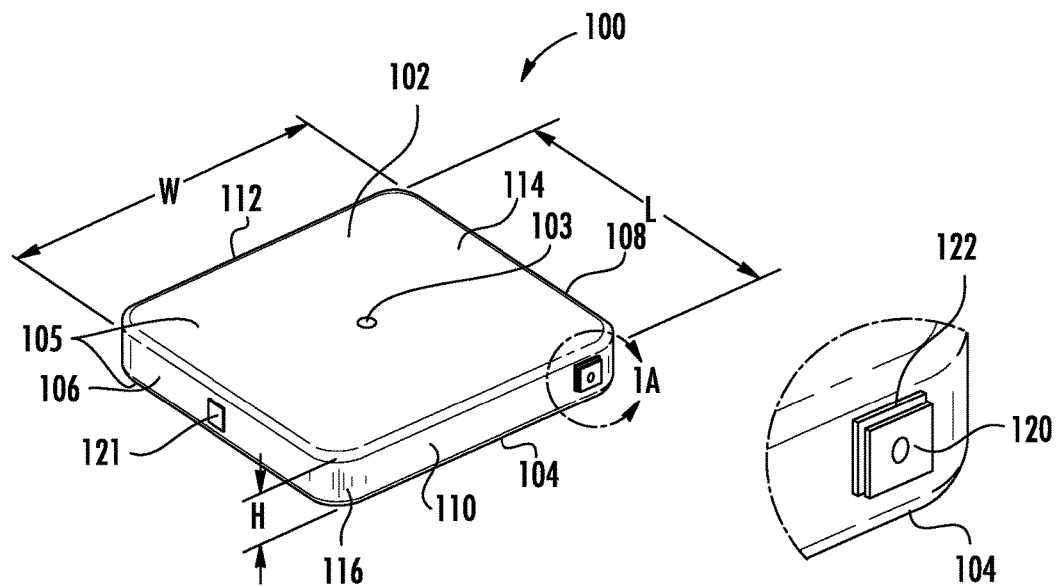
FIG. 1 is an isometric view of a capacitor according to an embodiment of the present invention.
FIG. 1A is an enlarged detailed view of the area defined by 1A in FIG. 1.

Certain terminology is used in the following description for convenience only and is not limiting. The words "right," "left," "top," and "bottom" designate directions in the drawings to which reference is made. The words "a" and "one," as used in the claims and in the corresponding portions of the specification, are defined as including one or more of the referenced item unless specifically stated otherwise. This terminology includes the words above specifically mentioned, derivatives thereof, and words of similar import. The phrase "at least one" followed by a list of two or more items, such as "A, B, or C," means any individual one of A, B, or C, as well as any combination thereof.

Figure 2:
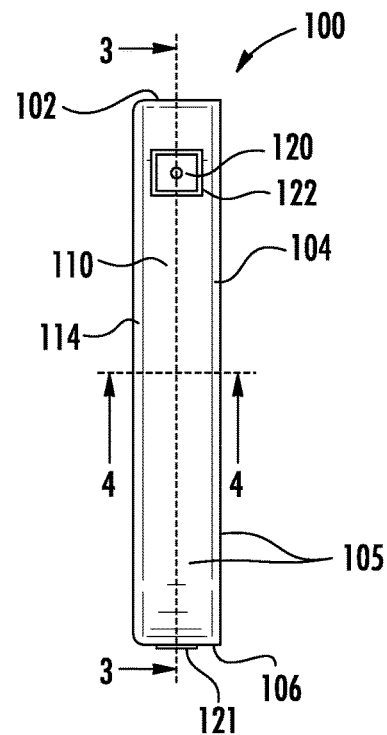
FIG. 2 is a left side view of a capacitor according to an embodiment of the present invention.
Figure 3:
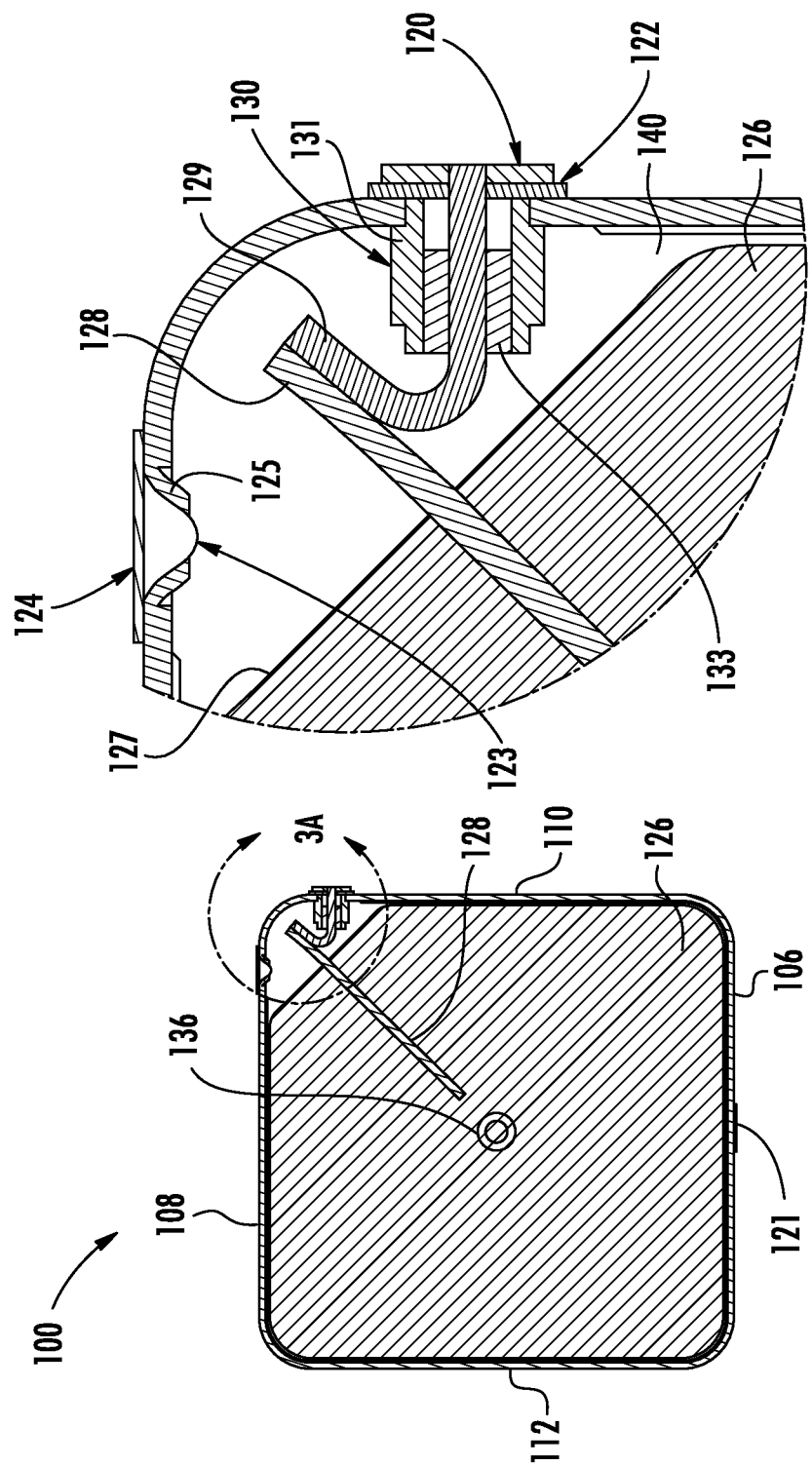
FIG. 3 is a cross-sectional view from the top of the capacitor according to an embodiment of the present invention taken along line 3-3 of FIG. 2.
Figure 4:
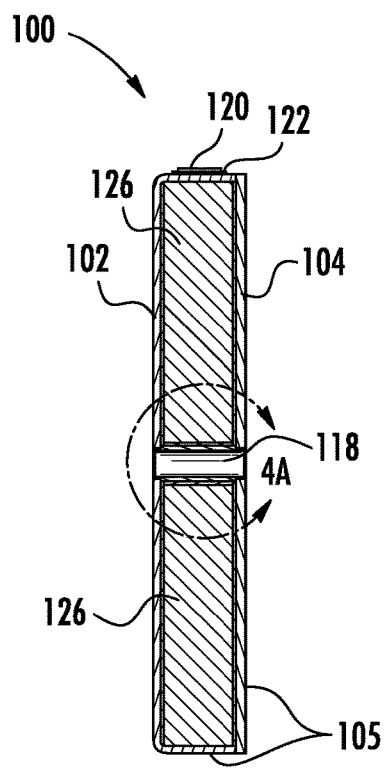
FIG. 4 is a cross-sectional view from the bottom of the capacitor according to an embodiment of the present invention taken along line 4-4 of FIG. 2.
Figure 5:
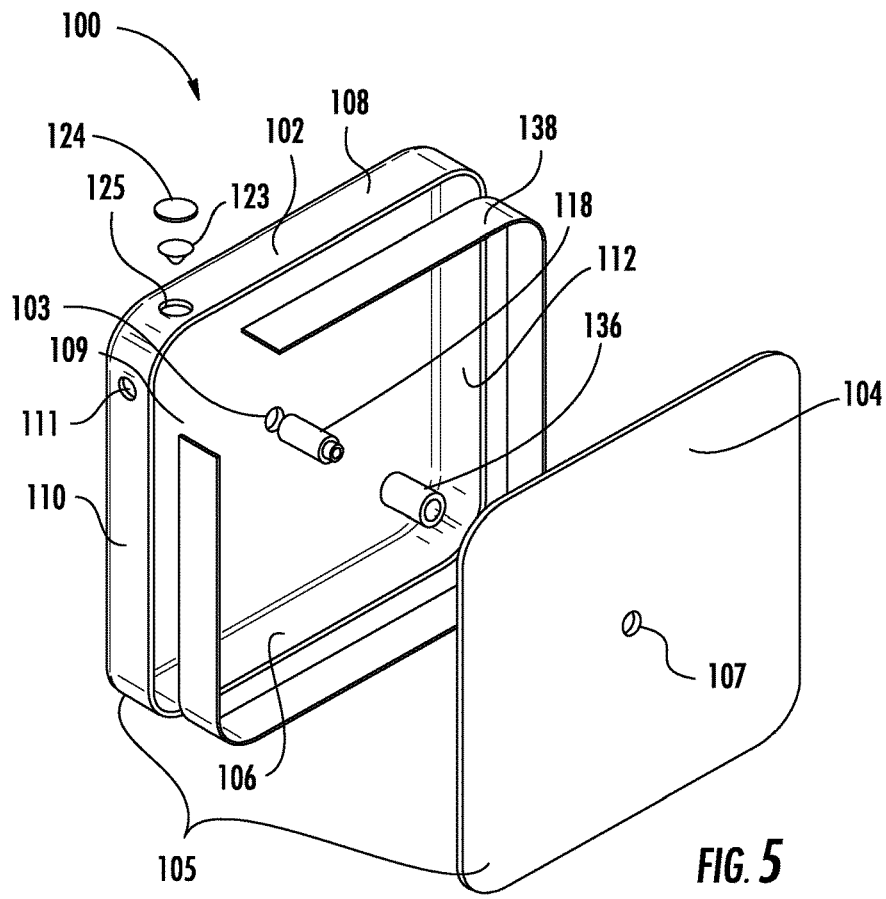
FIG. 5 is an exploded view of a capacitor case and case wall assembly according to an embodiment of the present invention.

FIGS. 1-6 show a capacitor 100 according to an embodiment of the present invention. Referring to FIGS. 1, 2, and 5, the capacitor 100 includes an outer case assembly 105 comprising an outer case 102 and outer case cover 104. The outer case 102 may be formed of metal, such as tantalum (Ta) and forms part of the cathode of the capacitor 100. The outer case 102 has a front side 106, a rear side 108, a left side 110, a right side 112, and a top 114. The outer case 102 preferably has an open end as shown in FIG. 5. The outer case cover 104 may be formed of the same metal as the outer case 102 (i.e., tantalum if tantalum is also used as the material of the outer case 102), and may be hermetically welded to the open end of the outer case 102 as shown in FIG. 5. The outer case cover 104 also forms part of the cathode. While the shape of the outer case 102 may vary, in an embodiment of the present invention and as shown in FIGS. 1-4, the sides 106, 108, 110, 112 may have a generally rectangular shape, and the top 114 may have a generally square overall shape. When the outer case cover 104 is hermetically welded to the outer case 102, the outer case assembly 105 is formed.

The outer case 102 further comprises an outer case opening 103 which may preferably be formed centrally in the top 114 of the outer case 102. The outer case cover 104 further comprises an outer case cover opening 107 which may preferably be formed centrally in the outer case cover 104, and is sized and positioned to align with the outer case opening 103. The outer case 102 further comprises an anode termination opening 111.

The outer case assembly 105 has a length L, a width W, and a height H. As shown in FIGS. 1, 2, and 5, the outer case assembly 105 forms a generally flat rectangular or square cuboid or prism with an interior area 109 or cavity. The sides 106-112 and top 114 of the outer case 102 may also have rounded or beveled edges at the corners 116. The ratio of width W to height H of the outer case assembly 105 should preferably be at least 4:1 to provide a low profile and to allow for the greatest amount of surface area of the conducting surfaces (i.e., anode and cathode). However, varying ratios, that are greater or less than 4:1, may be used to comply with dimensional constraints. The shape and construction of the outer case 102 assists in providing improved energy density over known capacitors while also providing a reduced height or profile that is advantageous in applications where height availability for components is limited.

As shown in FIGS. 1-6, the outer case 102 further includes a positive lead 120 disposed on the left side 110 over the anode termination opening 111. The positive lead 120 may be a metal plate, preferably formed of nickel (Ni) or a nickel (Ni) alloy. It should be noted that the positive lead 120 may comprise other materials as appreciated by a person of skill in the art. A positive lead insulator 122 may be provided between the positive lead 120 and the outer case 102 over the anode termination opening 111 to provide electrical isolation between the outer case 102, which is negative and forms part of the cathode of the capacitor 100, and the positive lead 120 which is positive. The positive lead insulator 122 may be formed from a material comprising polytetrafluoroethylene (PTFE). However, it is appreciated that the positive lead insulator 122 may comprise any non-conductive flexible material, and may be formed of materials such as Teflon or Kapton. The outer case 102 further includes a negative terminal 121 disposed on the front side 106 of the outer case 102. The negative terminal 121 may be a metal plate, preferably formed of a nickel weldment. It should be noted that the negative terminal 121 may comprise other materials as appreciated by a person of skill in the art. While the outer case assembly 105 forms the cathode (i.e., the negative electrode), the negative terminal 121 is attached to the outer case 102 of the outer case assembly 105 in order to provide for a convenient and reliable connection point to connect the capacitor 100 to an electrical circuit.

As shown in FIGS. 3, 3A, and 5, one side of the outer case 102, and in the illustrated examples, the rear side 108 of the outer case 102, includes a fill port 125 and a fill port cover 124. The fill port cover 124 may be formed from a valve metal, such as tantalum, titanium or niobium. In a preferred embodiment, the fill port cover 124 is formed from tantalum. The fill port cover 124 may be welded in place to the outer case 102 over the fill port 125 and a fill port plug 123 to effectively seal the fill port 125. The fill port 125 is used for introducing an electrolyte into an interior area of the outer case 102 during manufacture.

The fill port 125 and fill port plug 123, or variations thereof that may be used, are discussed in U.S. patent application Ser. No. 14/942,011, the entire contents of which are incorporated by reference herein. It should be noted that the fill port 125 may alternatively be formed in another position along the outer case 102 without departing from the scope of the present invention.

As shown in FIGS. 1, 3, 4, and 6, the capacitor 100 also preferably includes a connecting tube 118. The connecting tube 118 may be formed of metal, such as tantalum, and functions to connect the top 114 of the outer case 102 and the outer case cover 104 to prevent the outer case 102 and outer case cover 104 from expanding or contracting during exposure to harsh environmental or use conditions, such as, for example, extreme temperatures.

The connecting tube passes through the outer case opening 103 and the outer case cover opening 107. The connecting tube 118 may be connected, joined, or otherwise bonded to the outer case 102 and outer case cover 104, for example, adjacent the outer case opening 103 and the outer case cover opening 107, in a variety of ways known to those of skill in the art. Preferably the connecting tube 118 will be hermetically welded to the outer case 102 and outer case cover 104 adjacent the outer case opening 103 and the outer case cover opening 107. While the shape of the connecting tube 118 may vary, in an embodiment of the present invention and as shown in FIGS. 1, 3, 4, and 5, the connecting tube 118 may have a cylindrical tube shape having a hollow passage. The connecting tube 118 may also be connected to the approximate center of the outer case 102 and the outer case cover 104, however, it may alternatively be disposed in an off-center position, such as if the position of the outer case opening 103 and the outer case cover opening 107 are changed to a different position.

As shown in FIGS. 3-6, a capacitive element 126 is provided in the interior area 109 of the outer case assembly 105. The shape and the size of the capacitive element 126 may generally be slightly less than that of the outer case assembly 105 in order to provide for increased energy density, i.e., a large surface area. The capacitive element 126 (which may also be referred to in the art as an "anode body," "slug," or "pellet") may preferably be formed as a sintered, tantalum slug or solid pellet anode body, or may comprise other materials as appreciated by a person of skill in the art, such as niobium (Nb) or niobium monoxide (NbO). The capacitive element 126 is positioned in the interior area 109 and isolated from the outer case assembly 105 by one or more of the insulative elements, e.g., the first and second separator sheets 134a, 134b, insulator tube 136, and/or insulator band 138.

The capacitive element may include a dielectric layer 127, preferably tantalum pentoxide ($Ta_2O_5$) made by anodic oxidation of the capacitive element 126 to form an oxide layer over the surface of the capacitive element 126 (e.g., Ta to $Ta_2O_5$). Tantalum pentoxide possesses a high dielectric strength and a high dielectric constant. The dielectric layer 127 may be of varying thicknesses, depending on the target working voltage of the capacitor. The capacitive element 126 is immersed in a fluid electrolyte 140 held within the interior area 109 of the outer case assembly 105.

Figure 6:
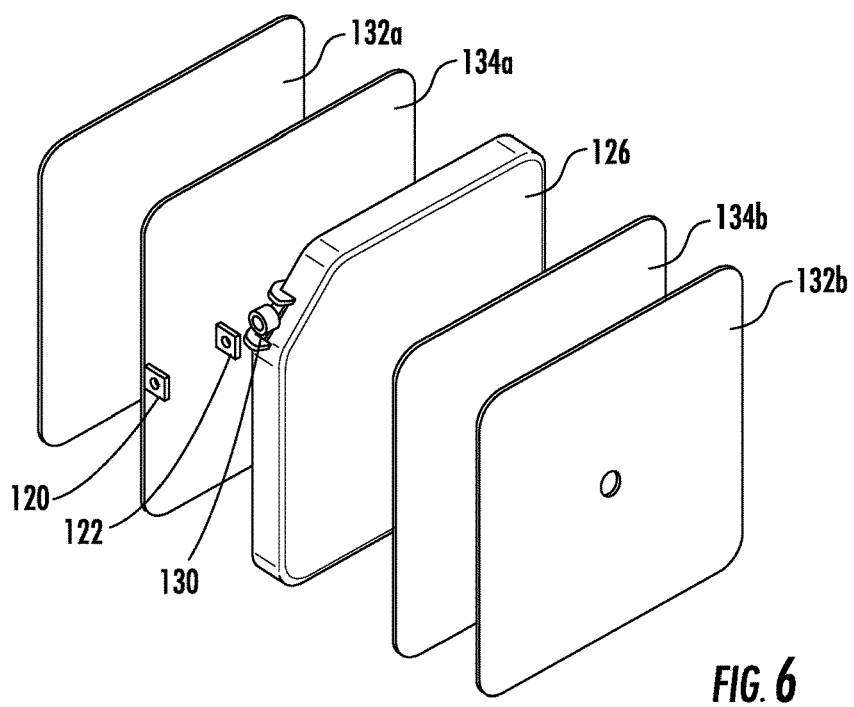
FIG. 6 is an exploded view of an anode assembly according to an embodiment of the present invention.

As shown in FIGS. 3, 3A, and 6, an anode wire 128 is provided extending from a side of the capacitive element 126. The anode wire 128 may be imbedded in, welded to, or otherwise connected, joined, or bonded to, the capacitive element 126. The anode wire 128 may preferably be formed of tantalum, or may comprise other materials as appreciated by a person of skill in the art. The anode wire 128 comprises a portion of the anode of the capacitor 100, and is in electrical communication with the capacitive element 126. As shown in FIGS. 3, 3A, and 6, the anode wire 128 is connected to a lead wire 129. In a preferred embodiment, the anode wire 1289 is welded to the lead wire 129. The lead wire 129 also comprises a portion of the anode of the capacitor 100. The lead wire 129 may be formed of tantalum. The lead wire 129 extends through the outer case 102 at the anode termination opening 111, and provides electrical communication between the capacitive element 126, the anode wire 129, and positive lead 120. A glass-to-metal seal (GTMS) 130 is positioned at the interior of the outer case 102 at approximately the position of the positive lead 120 and anode termination opening 111. The GTMS 130 may be hermetically welded on the interior side of the outer case 102 to effectively connect the lead wire 129 and the positive lead 120. The GTMS includes a conductive metal outer portion 131 formed from a metal, preferably tantalum, and a non-conductive inner portion 133 formed from glass. The lead wire 129 is positioned through the non-conductive inner portion 133. The non-conductive inner portion 133 of the GTMS 130 assists in isolating the lead wire 129 (and connected anode wire 128), from the outer case assembly 105. The GTMS 130 also functions to assist in sealing the outer case assembly 105 at the anode termination opening 111.

Figure 4A:
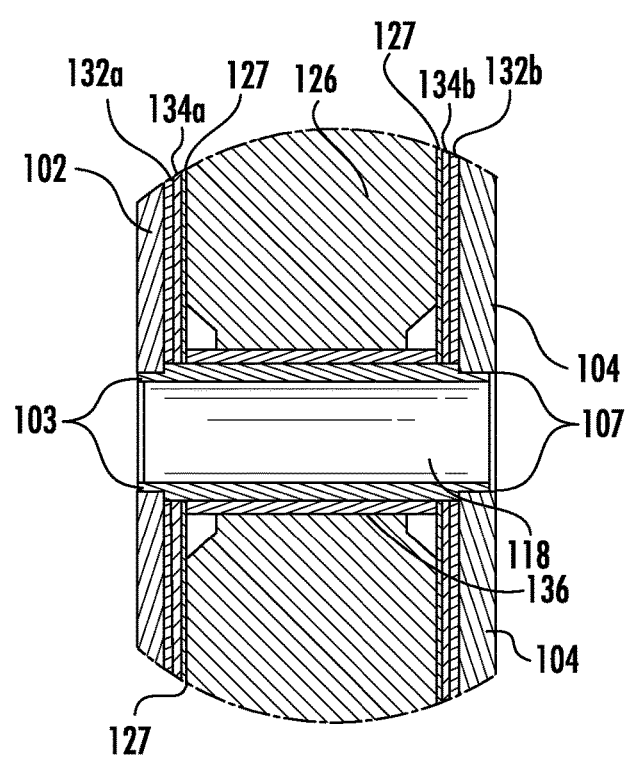
FIG. 4A is an enlarged detailed view of the area defined by 4A in FIG. 4.

As shown in FIGS. 4, 4A, and 6, a first and second cathode layer 132a, 132b are positioned on the internal surface of at least a portion of the outer case assembly 105, and may be formed from tantalum foil coated with palladium (Pd). The first and second cathode layers 132a, 132b are separated from the capacitive element 126 by first and second separator sheets 134a, 134b. The first and second separator sheets 134a, 134b may be formed from an electrolytic permeable material comprising polytetrafluoroethylene (PTFE), or some other non-conductive material. The first and second separator sheets 134a, 134b function to prevent contact between the anode elements (capacitive element 126, anode wire 128, lead wire 129) and the cathode elements (first and second cathode layers 132a, 132b and outer case assembly 105).

Similarly, as shown in FIGS. 3-5, an insulator tube 136 and an insulator band 138 are positioned within the outer case 102 to prevent contact between the anode elements (capacitive element 126, anode wire 128, lead wire 129), and the cathode elements (first and second cathode layers 132a, 132*b* and outer case assembly 105) and connecting tube 118. The insulator tube 136 is positioned over and covers the outer surface of connecting tube 118 that connects the outer case 102 and the outer case cover 104. The insulator tube 136 forms an isolative barrier between the cathode elements (first and second cathode layers 132*a*, 132*b* and outer case assembly 105) and the capacitive element 126. The insulator tube 136 may be formed from a material comprising polytetrafluoroethylene (PTFE), or some other non-conductive material.

The insulator band 138 is positioned around at least part of the internal perimeter of sides 106-112 of the outer case 102 and forms an isolative barrier between sides 106-112 of the outer case 102 and the capacitive element 126. As shown in FIG. 5, the insulator band 138 may not be a closed band and may include a gap to accommodate the anode wire 128, lead wire 129, GTMS 130, and associated termination at the positive lead 120. The insulator band 138 may be formed from a material comprising PTFE, or some other non-conductive material.

The low profile of capacitor 100 (due to the ratio of width to height of outer case assembly 105 preferably being at least 4:1) allows for compact mounting onto a printed circuit board (PCB). Additionally, the low profile of capacitor 100 allows for compact and easy mounting of several capacitors into a capacitor stack (connected in parallel or in series) to achieve increased total capacitance value and/or higher operating voltage while maintaining a low profile.

Figure 7:
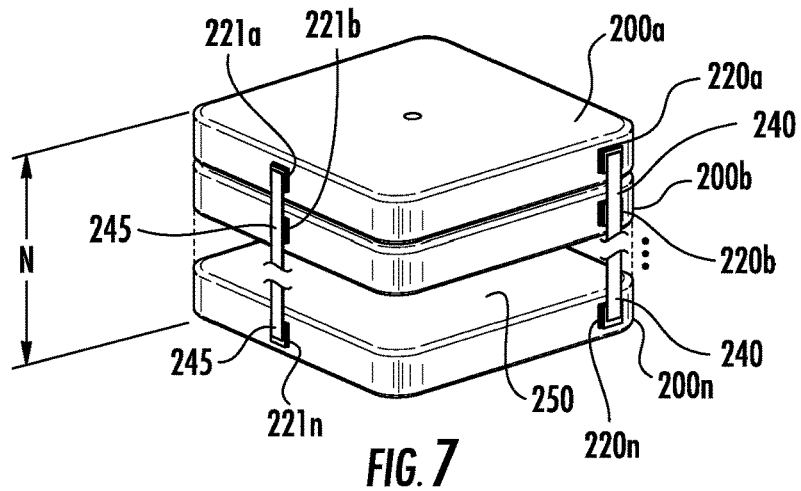
FIG. 7 is an isometric view of several capacitors mounted in a stacked formation and connected in parallel according to an embodiment of the present invention.

Referring to FIG. 7, there is shown a plurality of capacitors 200*a*, 200*b*, ..., 200*n* mounted in a stacked formation having a height N, which may be referred to as a "capacitor stack." In the embodiment of FIG. 7, the capacitors 200*a*, 200*b*, ..., 200*n* are stacked in the same orientation, so that the positive leads 220*a*, 220*b*, ..., 220*n* and the negative terminals 221*a*, 221*b*, ..., 221*n* are aligned on the same respective sides. As shown in FIG. 7, capacitors 200*a*, 200*b*, ..., 200*n* are electrically connected in parallel to increase total capacitance value. Each of the plurality of capacitors 200*a*, 200*b*, ..., 200*n* in the stack are connected via a positive termination 240 at each capacitor's respective positive lead 220*a*, 220*b*, ..., 220*n*. The positive termination 240 may have a generally planar shape, and may be shaped like a strip. The positive termination 240 may be connected to each capacitor's respective positive lead 220*a*, 220*b*, ..., 220*n* in a variety of ways known to one of skill in the art, but will preferably be welded to each capacitor's respective positive lead 220*a*, 220*b*, ..., 220*n*. The positive termination 240 is preferably formed as a thin piece of generally planar and/or generally rectangular metal, preferably formed of nickel or nickel alloys. However, it should be noted that the positive termination 240 may be of a different shape and/or configuration.

Each of the plurality of capacitors 200*a*, 200*b*, ..., 200*n* in the stack are also connected via a negative termination 245 at each capacitor's negative terminal 221*a*, 221*b*, ..., 221*n*. The negative termination 245 may have a generally planar shape, and may be shaped like a strip. The negative termination 245 may be connected to each capacitor's respective negative terminal 221*a*, 221*b*, ..., 221*n* in a variety of ways known to one of skill in the art, but will preferably be welded to each capacitor's negative terminal 221*a*, 221*b*, ..., 221*n*. The negative termination 245 is preferably formed as a thin piece of generally planar and/or generally rectangular metal, preferably formed of nickel or nickel alloys. However, it should be noted that the negative termination 245 may be of a different shape and/or configuration. The openings 107 of the plurality of capacitors 200*a*, 200*b*, ..., 200*n* in the stack are preferably aligned at a central location of the stack.

As shown in FIG. 7, one or more insulator sheets 250 may be positioned between each of the plurality of capacitors 200*a*, 200*b*, ..., 200*n*. The insulator sheet(s) 250 may be formed from an electrolytic permeable material comprising polytetrafluoroethylene (PTFE), or some other non-conductive material.

Figure 8A:
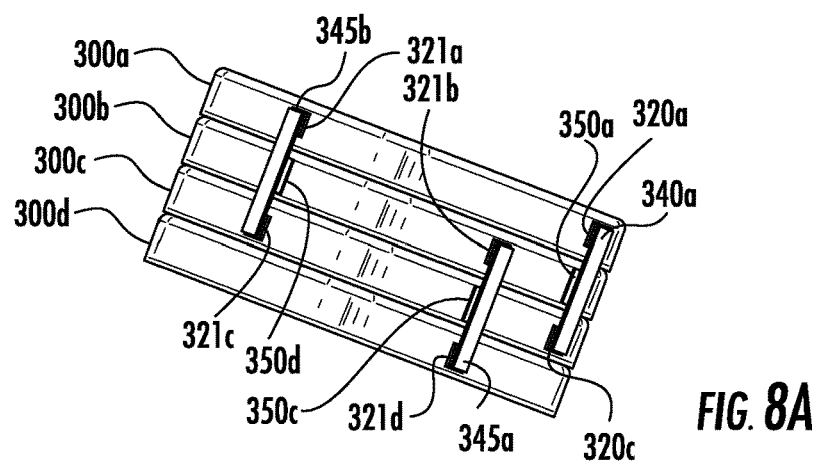
FIG. 8A is an isometric view of several capacitors mounted in a stacked formation and connected in series according to an embodiment of the present invention.
Figure 8B:
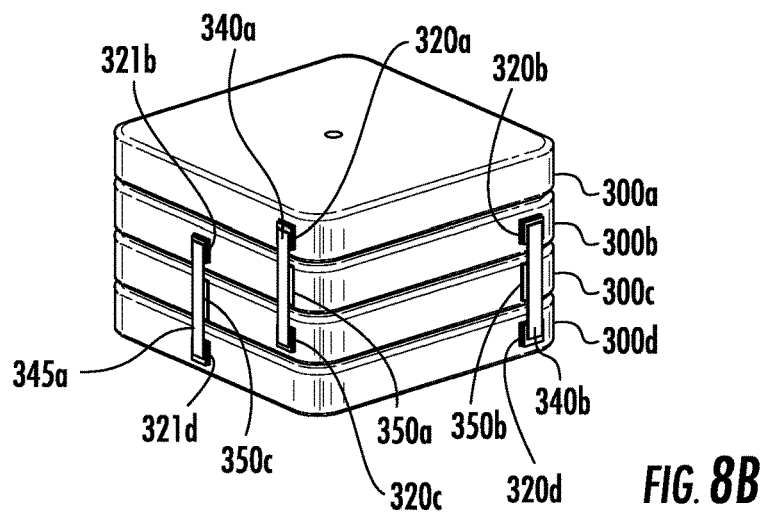
FIG. 8B is an isometric view of several capacitors mounted in a stacked formation and connected in series according to an embodiment of the present invention.

Referring to FIGS. 8A and 8B, there is shown a plurality of capacitors 300*a*, 300*b*, 300*c*, 300*d* mounted in a stacked formation. The view shown in FIG. 8B is a 90 degree clockwise rotation of the view shown in FIG. 8A, so that all of the connecting terminations (positive terminations and negative terminations) are illustrated. The plurality of capacitors 300*a*, 300*b*, 300*c*, 300*d* are stacked in alternating rotated orientations, such as 90 degree alternating rotated orientations between adjacent capacitors in the stack, so that the positive leads 320*a*, 320*c* and the negative terminals 321*a*, 321*c* of the first and third capacitor 300*a*, 300*c*, are aligned and on the same side of the capacitor stack, and the positive leads 320*b*, 320*d* and the negative terminals 321*b*, 321*d* of the second and fourth capacitor 300*b*, 300*d* are aligned and on the same side of the capacitor stack. Stated another way, capacitors 300*a* and 300*c* will be oriented identically and capacitors 300*b* and 300*d* will be oriented identically.

Although four (4) capacitors are illustrated, more or less than four (4) capacitors may be stacked, and the use of four (4) capacitors is only for the purposes of illustration. As shown in FIGS. 8A and 8B, capacitors 300*a*, 300*b*, 300*c*, 300*d* are electrically connected in series to achieve higher operating voltage. A first positive termination 340*a* connects the positive leads 320*a*, 320*c* of capacitor 300*a* and 300*c*. The first positive termination 340*a* may be connected to the positive leads 320*a*, 320*c* of capacitor 300*a* and 300*c* in a variety of ways known to one of skill in the art, but will preferably be welded to the positive leads 320*a*, 320*c* of capacitor 300*a* and 300*c*. The first positive termination 340*a* is preferably formed as a thin piece of generally planar and/or generally rectangular metal, preferably formed of tantalum. A first isolator 350*a* may be positioned between the first positive termination 340*a* and the outer case of capacitor 300*b*. The isolator 350*a* may be formed of Teflon, Kapton or other electrically isolative material. A second positive termination 340*b* connects the positive leads 320*b*, 320*d* of capacitor 300*b* and 300*d*. The second positive termination 340*b* may be connected to the positive leads 320*b*, 320*d* of capacitor 300*b* and 300*d* in a variety of ways known to one of skill in the art, but will preferably be welded to the positive leads 320*b*, 320*d* of capacitor 300*b* and 300*d*. The second positive termination 340*b* is preferably formed as a thin piece of generally planar and/or generally rectangular metal, preferably formed of tantalum. A second isolator 350*b* may be positioned between the second positive termination 340*b* and the outer case of capacitor 300*c*. The second isolator 350*b* may be formed of the same material as first isolator 350*a*.

Similarly, a first negative termination 345*a* connects the outer case (cathode) at the negative terminals 321*b*, 321*d* of capacitor 300*b* and 300*d*. The first negative termination 345*a* may be connected to the negative terminals 321*b*, 321*d* of capacitor 300*b* and 300*d* in a variety of ways known to one of skill in the art, but will preferably be welded to the negative terminals 321*b*, 321*d* of capacitor 300*b* and 300*d*. The first negative termination 345*a* is preferably formed as a thin piece of generally planar and/or generally rectangular metal, preferably formed of tantalum. A third isolator 350c may be positioned between the first negative termination 345a and the outer case of capacitor 300c. The third isolator 350c may be formed of the same material as isolators 350a, 350b. A second negative termination 345b connects the outer case (cathode) at the negative terminals 321a, 321c of capacitor 300a and 300c. The second negative termination 345b may be connected to the negative terminals 321a, 321c of capacitor 300a and 300c in a variety of ways known to one of skill in the art, but will preferably be welded to the negative terminals 321a, 321c of capacitor 300a and 300c. The second negative termination 345b is preferably formed as a thin piece of generally planar and/or generally rectangular metal, preferably formed of tantalum. A fourth isolator 350d may be positioned between the second negative termination 345b and the outer case of capacitor 300b. The isolator 350d may be formed of the same material as isolators 350a-350c.

Figure 9:
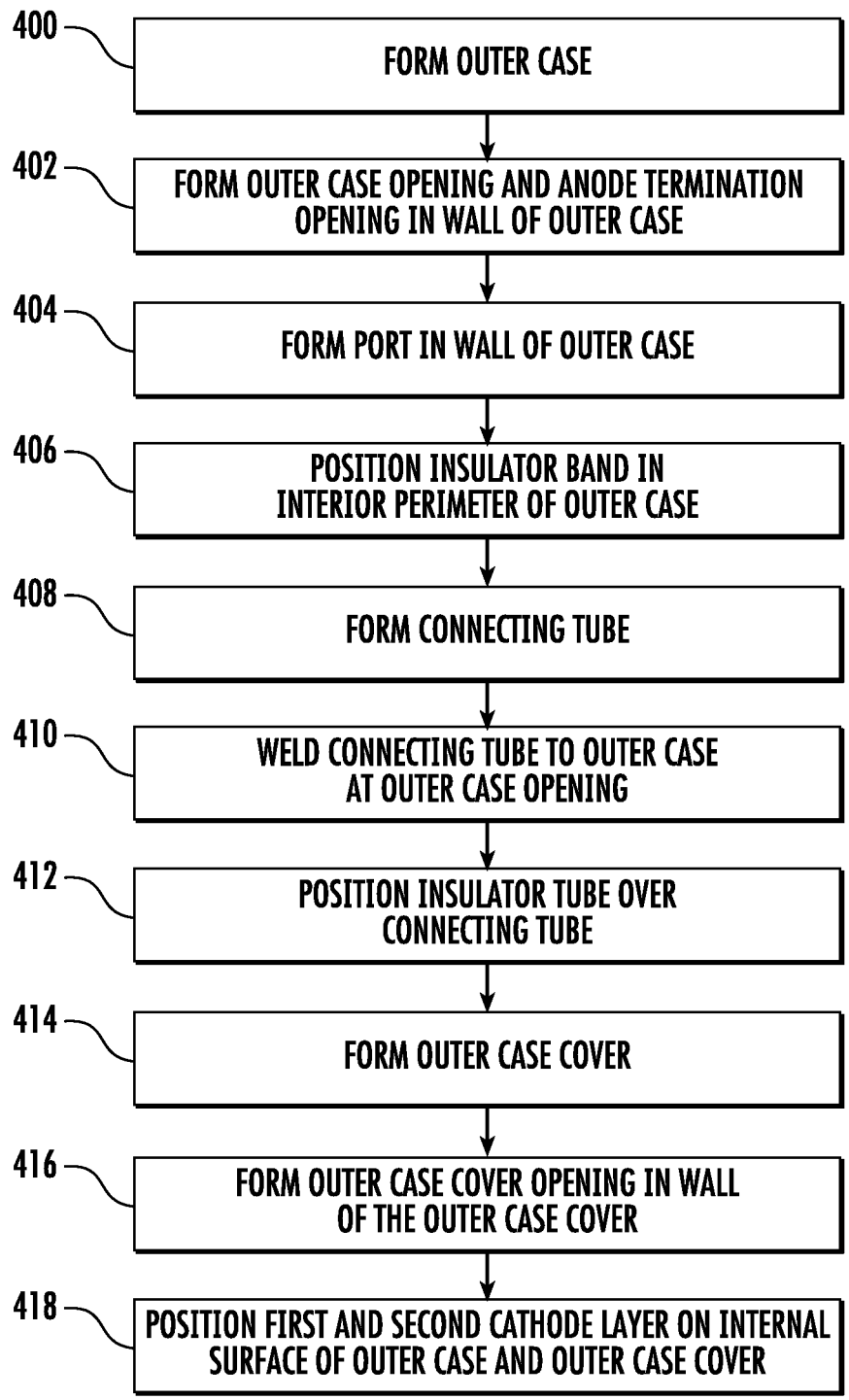
FIG. 9 is a flow diagram of a process for assembling a capacitor according to an embodiment of the present invention.
Figure 10:
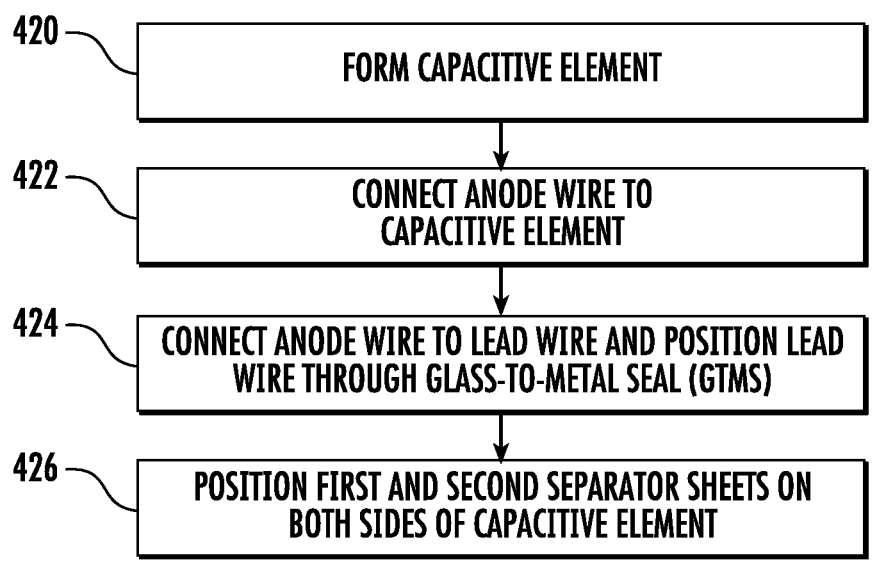
FIG. 10 is a flow diagram of a process for making the capacitor element according to an embodiment of the present invention.
Figure 11:
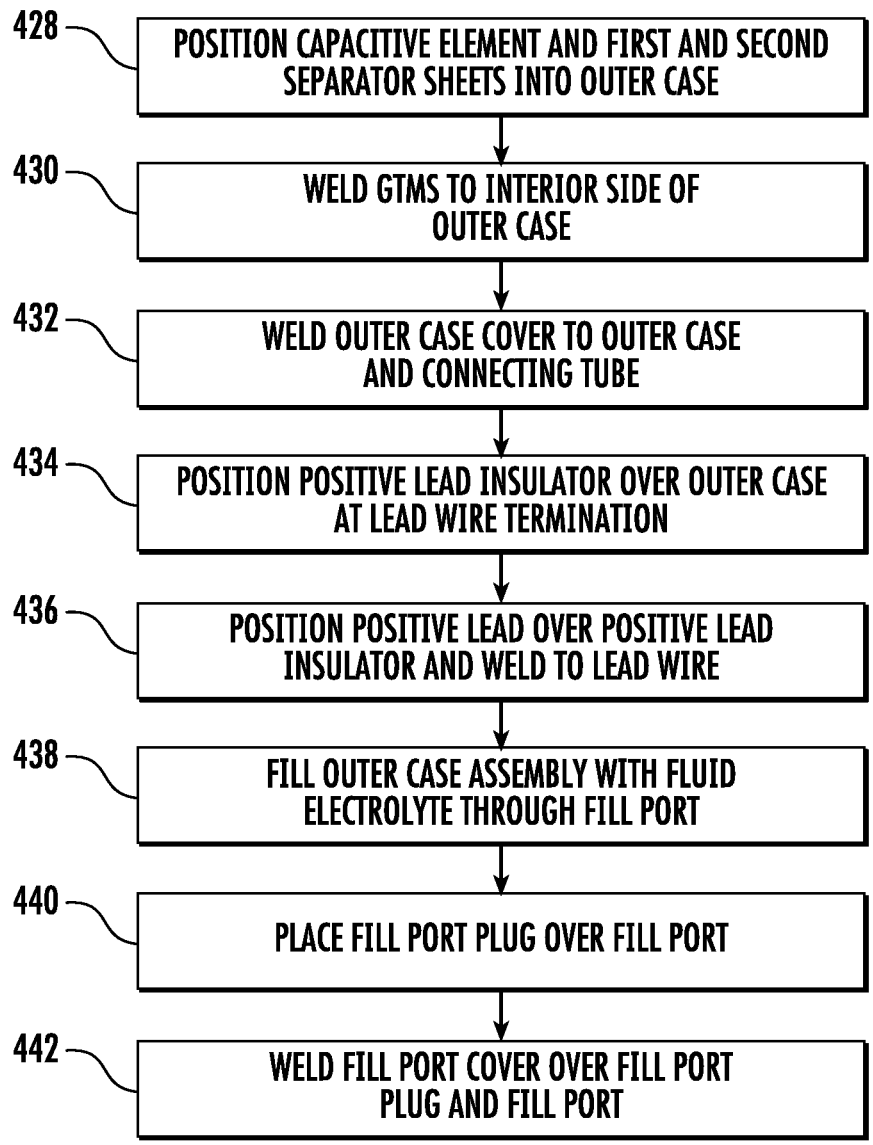
FIG. 11 is a flow diagram of a process for assembling a capacitor according to an embodiment of the present invention.

As shown schematically as flow diagrams in FIGS. 9-11, a method of manufacturing a capacitor according to the invention is also provided.

As illustrated in FIG. 9, first, the outer case assembly is prepared. An outer case 102 is formed [400], having an open end and interior area 109. An outer case opening 103 is formed in a top wall of the outer case 102 and an anode termination opening 111 is formed in a sidewall of the outer case [402]. A fill port 125 is formed in a wall of the outer case 102 [404]. An insulator band 138 is positioned around at least part of the interior perimeter of the outer case 102 [406]. A connecting tube 118 is formed [408]. The connecting tube 118 is welded to the outer case 102 at the outer case opening 103 [410]. An insulator tube 136 is positioned over the outer surface of connecting tube 118 [412]. An outer case cover 104 is formed [414]. An outer case cover opening 107 is formed in a wall of the outer case cover 104 [416]. A first and second cathode layer 132a, 132b are positioned on the internal surface of the outer case 102 and the outer case cover 104 [418].

As illustrated in FIG. 10, a capacitive element of the capacitor is also prepared. First, the capacitive element 126 is formed as a sintered, tantalum slug [420]. An anode wire 128 is connected to the capacitive element 126 [422]. In a preferred embodiment, the anode wire 128 is welded to the capacitive element 126. The anode wire 128 is connected to a lead wire 129 and positioned through a GTMS 130 [424]. A first and second separator sheet 134a, 134b are positioned on both sides of the capacitive element 126 [426].

Steps for capacitor assembly are illustrated in FIG. 11. The capacitive element 126 and first and second separator sheets 134a 134b are positioned inside the interior area 109 of the outer case 102 [428]. The GTMS 130 is welded into place on the interior side of the outer case 102 [430]. The outer case cover 104 is welded to the outer case 102 and to the connecting tube 118 [432]. A positive lead insulator 122 is placed over the outer case 102 over the anode termination opening 111 at the termination point of the lead wire 129 [434]. A positive lead 120 is placed over the positive lead insulator 122 and welded to the lead wire 129 [436]. A fluid electrolyte is introduced into the interior area 109 through the fill port 125 [438]. A fill port plug 123 is placed against the fill port 125 [440]. A fill port cover 124 is placed over the fill port plug 123 and the fill port 125, compressing the fill port plug 123 into the fill port 125, and the fill port cover 124 is welded in place to the outer case 102 [442].

Figure 12:
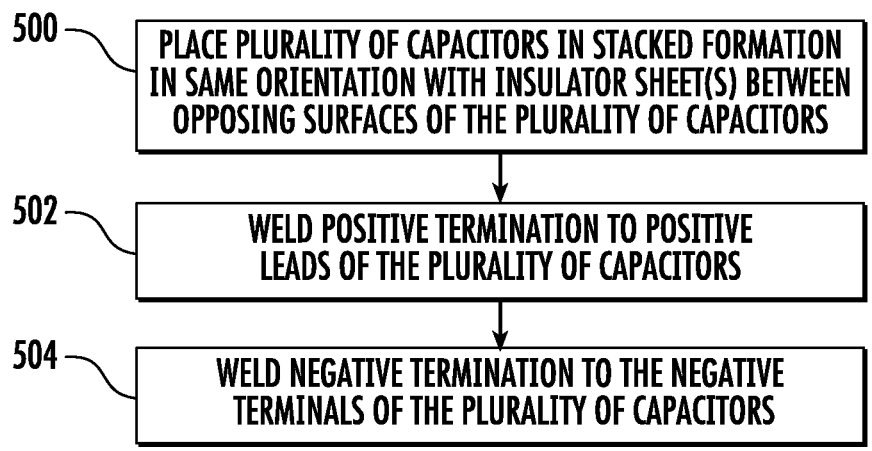
FIG. 12 is a flow diagram of a process for assembling a stacked capacitor assembly connected in parallel according to an embodiment of the present invention.

Steps for stacked capacitor assembly connected in parallel are illustrated in FIG. 12. A plurality of capacitors 200a, 200b, . . . , 200n are provided. The plurality of capacitors 200a, 200b, . . . , 200n, are placed in a stacked formation with an insulator sheet 250 placed between the opposing surfaces of each of the plurality of capacitors 200a, 200b, . . . , 200n [500]. A positive termination 240 is welded to each capacitor's respective positive lead 200a, 220b, . . . , 220n [502]. A negative termination 245 is welded to each capacitor's negative terminals 221a, 221b, . . . , 221n [504].

Figure 13:
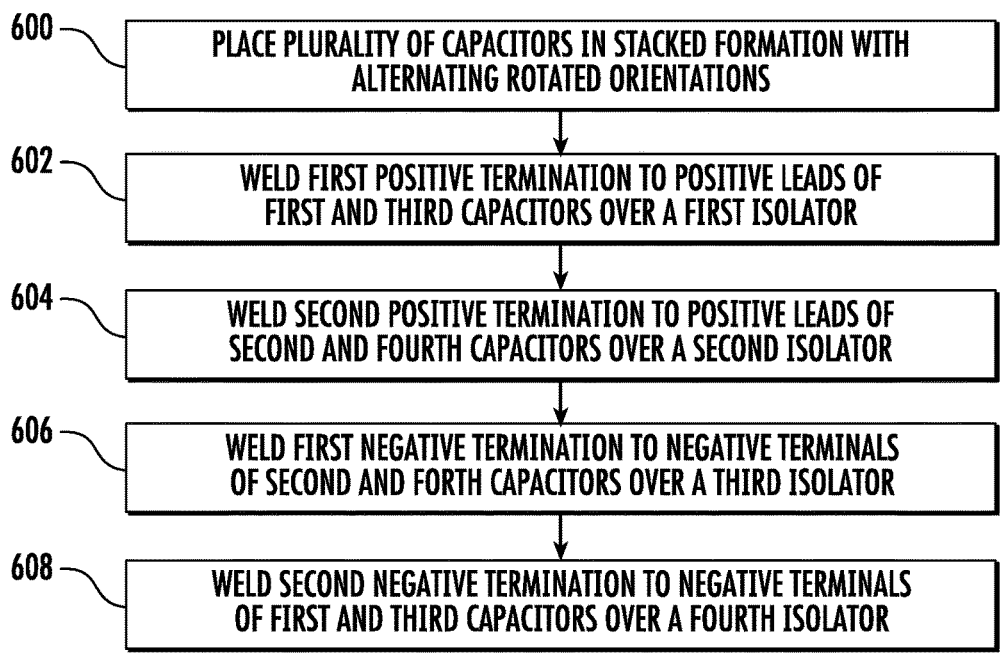
FIG. 13 is a flow diagram of a process for assembling a stacked capacitor assembly connected in series according to an embodiment of the present invention.

Steps for stacked capacitor assembly connected in series are illustrated in FIG. 13. A plurality of capacitors 300a, 300b, 300c, 300d are provided. The plurality of capacitors 300a, 300b, 300c, 300d are placed in a stacked formation in alternating rotated orientations, so that the positive leads 320a, 320c and the negative terminals 321a, 321c of the first and third capacitor 300a, 300c, are on the same side, and the positive leads 320b, 320d and the negative terminals 321b, 321d of the second and fourth capacitor 300b, 300d are on the same side [600]. A first positive termination 340a is positioned over a first isolator 350a, positioned between the first positive termination 340a and the outer case of capacitor 300b, and is placed over and welded to the positive leads 320a, 320c of capacitor 300a and 300c [602]. A second positive termination 340b is positioned over a second isolator 350b, positioned between the second positive termination 340b and the outer case of capacitor 300c, and is placed over and welded to the positive leads 320b, 320d of capacitor 300b and 300d [604]. A first negative termination 345a is positioned over a third isolator 350c, positioned between the first negative termination 345a and the outer case of capacitor 300c, and is placed over and welded to the negative terminals 321b, 321d of capacitor 300b and 300d [606]. A second negative termination 345b is positioned over a fourth isolator 350d, positioned between the second negative termination 345b and the outer case of capacitor 300b, and is placed over and welded to the negative terminals 321a, 321c of capacitor 300a and 300c [608].

Although the features and elements of the present invention are described in the example embodiments in particular combinations, each feature may be used alone without the other features and elements of the example embodiments or in various combinations with or without other features and elements of the present invention.

What is claimed is:

1. A low profile wet electrolytic capacitor, comprising:
   an outer case assembly defining an interior area and comprising an outer case and outer case cover hermetically sealed to the outer case;
   a capacitive element positioned in the interior area and isolated from the outer case assembly;
   one or more insulative elements configured to isolate the capacitive element from the outer case assembly, wherein the insulative elements comprise separator sheets positioned on a first and a second side of the capacitive element;
   a connecting tube having a continuous cylindrical metal wall positioned perpendicular to and attached to the outer case and the outer case cover and passing through an opening in the capacitive element;
   an isolated positive lead positioned on the outer case assembly in electrical communication with the capacitive element;
   a negative terminal positioned on the outer case assembly; and
   a fluid electrolyte contained in the interior area of the outer case assembly.

2. The low profile wet electrolytic capacitor of claim 1, wherein the outer case assembly has a ratio of width to height of at least 4:1.

3. The low profile wet electrolytic capacitor of claim 1, wherein the insulative elements further comprise an insulator band positioned around at least part of an interior of the outer case assembly.

4. The low profile wet electrolytic capacitor of claim 3, wherein the insulative elements further comprise an insulator tube positioned over and covering an outer surface of the connecting tube.

5. The low profile wet electrolytic capacitor of claim 1, further comprising a first and second cathode layer positioned on an internal surface of at least a portion of the outer case assembly.

6. The low profile wet electrolytic capacitor of claim 1, wherein the capacitive element comprises tantalum.

7. The low profile wet electrolytic capacitor of claim 1, wherein the outer case assembly comprises tantalum.

8. The low profile wet electrolytic capacitor of claim 1, further comprising:
an anode wire connected to the capacitive element at a first end and the isolated positive lead at a second end via a lead wire, wherein the anode wire and the lead wire facilitate the electrical communication between the isolated positive lead and the capacitive element.

9. The low profile wet electrolytic capacitor of claim 1, wherein the low profile wet electrolytic capacitor is mounted in a capacitor stack with at least one other capacitor.

10. The low profile wet electrolytic capacitor of claim 9, wherein the low profile wet electrolytic capacitor is mounted in the capacitor stack with the at least one other capacitor in the same orientation.

11. The low profile wet electrolytic capacitor of claim 9, wherein the low profile wet electrolytic capacitor is mounted in the capacitor stack with the at least one other capacitor in alternating rotated orientations.

12. The low profile wet electrolytic capacitor of claim 9, wherein the low profile wet electrolytic capacitor is electrically connected to the at least one other capacitor in parallel.

13. The low profile wet electrolytic capacitor of claim 9, wherein the low profile wet electrolytic capacitor is electrically connected to the at least one other capacitor in series.

14. A low profile wet electrolytic capacitor stack, comprising:
a plurality of low profile wet electrolytic capacitors mounted in a stack formation, wherein each of the plurality of low profile wet electrolytic capacitors comprises:
an outer case assembly defining an interior area and comprising an outer case and outer case cover hermetically sealed to the outer case;
a capacitive element positioned in the interior area and isolated from the outer case assembly;
a connecting tube having a continuous cylindrical metal wall positioned perpendicular to and attached to the outer case and the outer case cover and passing through an opening in the capacitive element;
an isolated positive lead positioned on the outer case assembly in electrical communication with the capacitive element;
a negative terminal positioned on the outer case assembly; and
a fluid electrolyte contained in the interior area of the outer case assembly.

15. The low profile wet electrolytic capacitor stack of claim 14, wherein the plurality of low profile wet electrolytic capacitors are mounted in the stack formation in the same orientation.

16. The low profile wet electrolytic capacitor stack of claim 14, wherein the plurality of low profile wet electrolytic capacitors are mounted in the stack formation in alternating rotated orientations.

17. The low profile wet electrolytic capacitor stack of claim 14, wherein each of the plurality of low profile wet electrolytic capacitors are electrically connected in parallel.

18. The low profile wet electrolytic capacitor stack of claim 14, wherein at least one of the plurality of low profile wet electrolytic capacitors is electrically connected to at least another one of the plurality of the low profile wet electrolytic capacitors in series.

19. A low profile wet electrolytic capacitor, comprising:
an outer case assembly defining an interior area and comprising an outer case and outer case cover hermetically sealed to the outer case;
a first and second cathode layer positioned on an internal surface of at least a portion of the outer case assembly;
a capacitive element positioned in the interior area and isolated from the outer case assembly;
a connecting tube having a continuous cylindrical metal wall positioned perpendicular to and attached to the outer case and the outer case cover and passing through an opening in the capacitive element;
an isolated positive lead positioned on the outer case assembly in electrical communication with the capacitive element;
a negative terminal positioned on the outer case assembly; and
a fluid electrolyte contained in the interior area of the outer case assembly.

* * * * *